Figure 1:
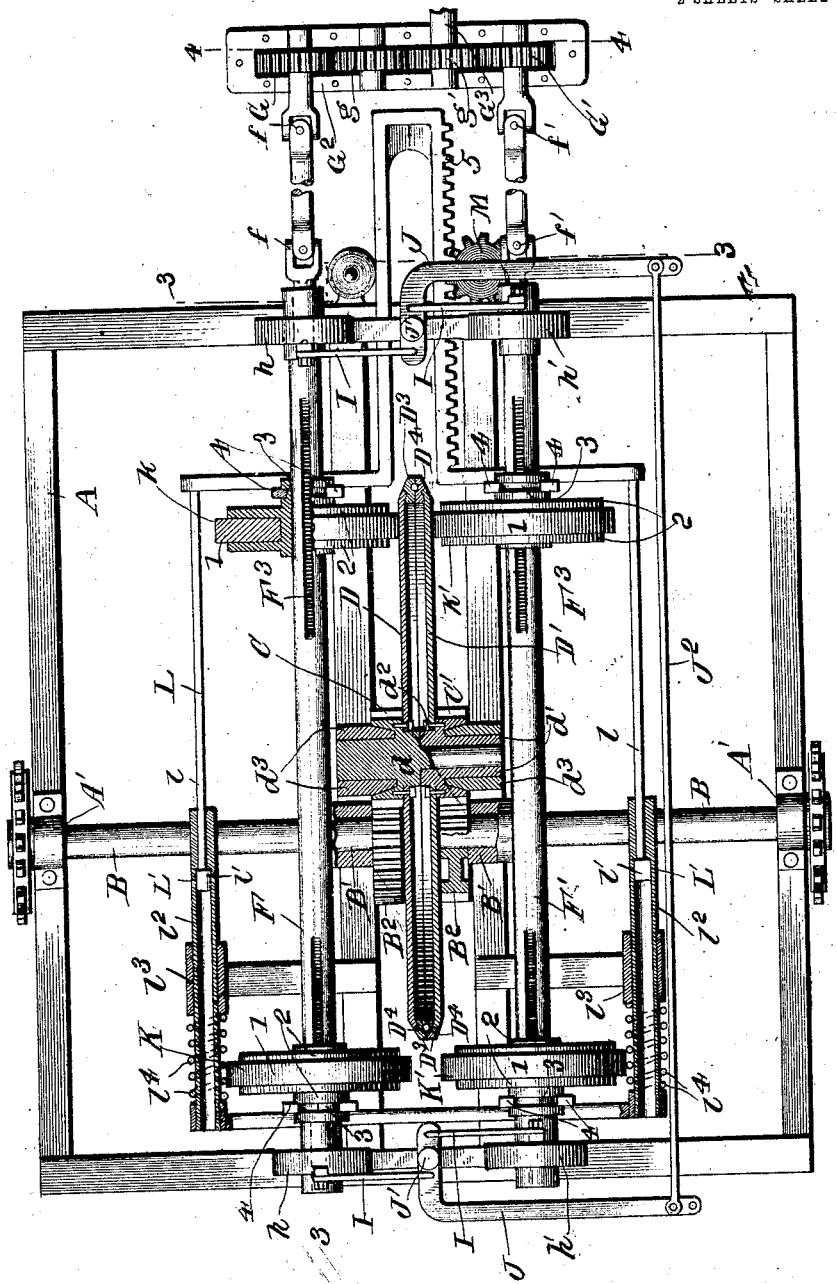

No. 842,773.

PATENTED JAN. 29, 1907.

W. DEGEN & A. MANUEL.
TRANSMISSION GEAR.
APPLICATION FILED JUNE 26, 1906.

2 SHEETS—SHEET 1.

WITNESSES:

INVENTORS,
WILLIAM DEGEN
AUGUSTUS MANUEL
BY Munn & Co.
ATTORNEYS.

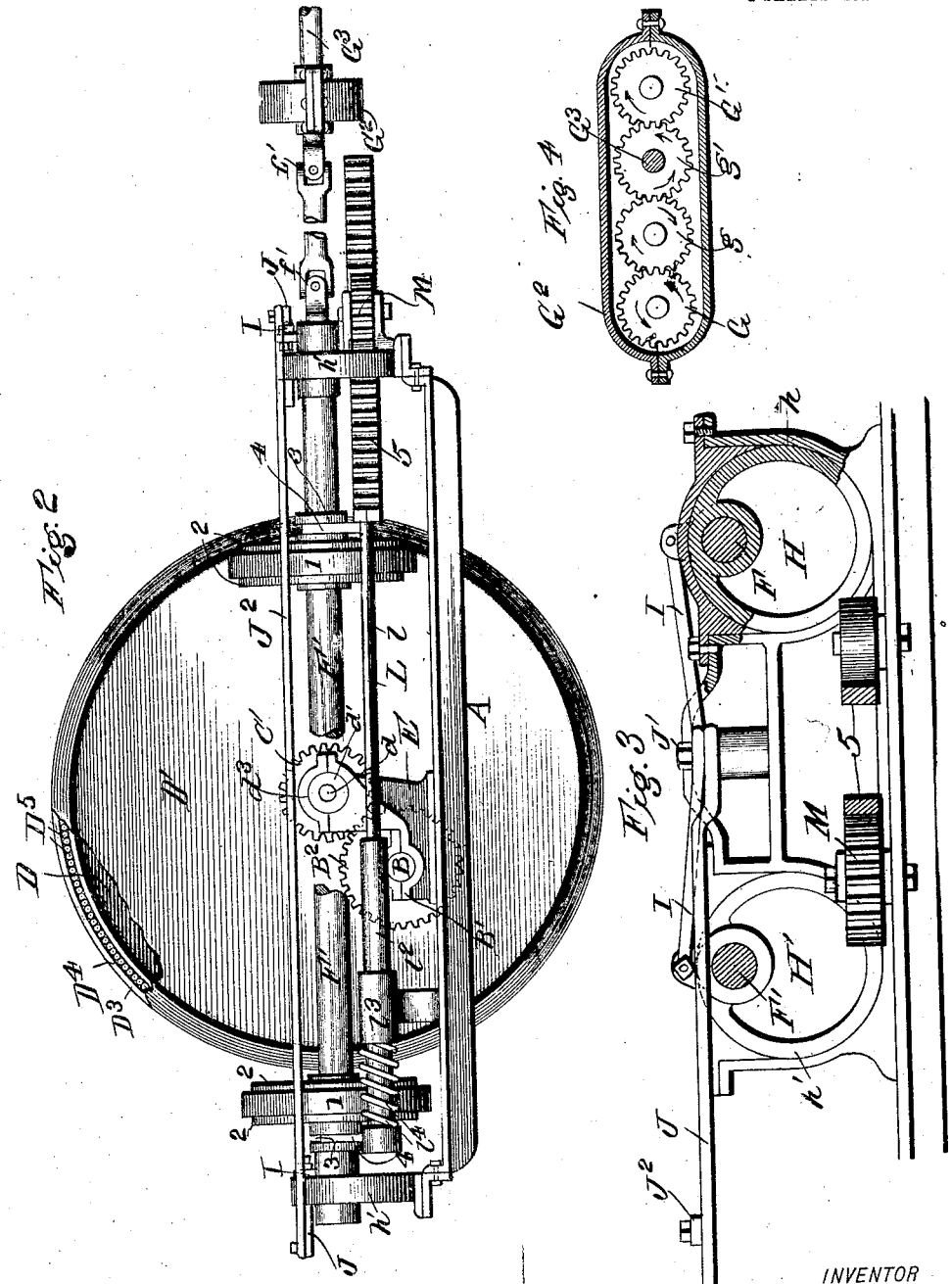

UNITED STATES PATENT OFFICE.

WILLIAM DEGEN AND AUGUSTUS MANUEL, OF FRESNO, CALIFORNIA.

TRANSMISSION-GEAR.

No. 842,773.　　　Specification of Letters Patent.　　　Patented Jan. 29, 1907.

Application filed June 26, 1906. Serial No. 323,492.

*To all whom it may concern:*

Be it known that we, WILLIAM DEGEN and AUGUSTUS MANUEL, of Fresno, in the county of Fresno and State of California, have invented certain new and useful Improvements in Transmission-Gears, of which the following is a specification.

This invention is an improvement in friction-gearing designed especially for use in transmission and compensating gears employed in automobiles and the like; and the invention consists in certain novel constructions and combinations of parts, as will be hereinafter described and claimed.

In the drawings, Figure 1 is a top plan view, partly in section, of an apparatus embodying our invention. Fig. 2 is a side elevation thereof, parts being broken away. Fig. 3 is a cross-section on about line 3 3 of Fig. 1, and Fig. 4 is a detail cross-section on about line 4 4 of Fig. 1.

In carrying out our invention we employ a suitable framing A, to which the several parts are connected. This framing has bearings at A' for the outer ends of the counter-shafts B, the inner ends of which are journaled in bearings B' and are provided with gear-wheels B², meshing with their respective gear-wheels C and C' in connection with the friction-disks D and D', as will be understood from Figs. 1 and 2 of the drawings.

The disks D and D' are alike, are arranged concentrically and in parallel planes, are located in close proximity, and their outer edges are turned in toward each other, forming the inner concave and the outer convex sides, as best shown in Fig. 1. These disks are composed of thin sheet-metal plates—such, for instance, as the plates from which circular saws are formed—and the disks are secured upon central arbor-sections $d$ and $d'$, the section $d$ being turned down at $d^2$ to form a shoulder and the other section $d'$ being bored out to fit over the section $d$ and abut the said shoulder $d^2$, so the disks may turn independently of each other in such manner as to equalize the action of the two hind wheels of an automobile, which hind wheels may be connected by chain, belt or otherwise with the counter-shafts B, as will be understood by those skilled in the art.

The arbor-sections $d$ and $d'$ are journaled in boxes $d^3$, secured on the framing, and by preference the bearings $d^3$ and the inner bearings $b'$ for the shafts B are mounted in the same stands E, (see Fig. 2,) so that the gear-wheels B² and the gear-wheels C and C' in connection with the friction-disks will be held securely in mesh, as will be understood from Figs. 1 and 2 of the drawings.

At their outer edges at their inner sides the disks D and D' are provided with ribs D³, having coincident annular grooves D⁴, forming a ball-race in which the balls D⁵ operate, relieving friction between the parts and permitting the disks D and D' to move independently.

By the described construction it will be noticed that as the friction-disks are turned motion will be transmitted to their respective wheels through their counter-shafts, as before described.

For driving the friction-disks we provide the opposite pulley-shafts F and F', which extend parallel to the planes of the friction-disks and are geared together at one end by gear-wheels G, G', $g$, and $g'$, the gears G, G', $g$, and $g'$ meshing, as shown in Figs. 1 and 4, and being inclosed in an oil-tight case G², and the shaft G³, connected with the gear $g'$, being the power-shaft, which in practice is suitably connected with an engine or other form of motor.

By the described construction it will be noticed the shafts F and F' will be caused to rotate in opposite directions, so that the friction-pulleys thereon and presently described, bearing on the friction-disks on the opposite sides of the same, will operate to turn their respective disks in the same direction.

The shafts F and F' are made in sections united by universal joints at $f$ and $f'$ (see Fig. 1) to permit the pulley-shafts to be moved toward and from the friction-disks in order to set the friction-pulleys into and out of frictional engagement with their disks without throwing the gears between the pulley-shafts and drive-shaft out of mesh.

The main sections of the shafts F and F' are journaled in bearings in eccentrics H and H', mounted in suitable strap-frames $h$ and $h'$, (see Figs. 3 and 6,) the eccentrics being connected by links I (see Fig. 1) with levers J, pivoted at J' to the frame at the opposite ends thereof, and the opposite levers J being connected by a rod J², so the levers may be operated jointly to set the shafts F and F' toward or from the disks.

The pulley-shafts F and F' are provided with longitudinal keyways F³, and friction-pulleys K k K′ k′ are keyed on the shafts F F′ and may be moved longitudinally along the same, turning with the shafts, as will be understood from the drawings. The pulleys K and K′ are arranged on opposite sides of the center of the disks D and D′ from their corresponding pulleys k and k′ and are connected together by the shifter-frame, so that when the pulleys K and K′ are moved out of engagement with the friction-disks to the position shown in Fig. 1 their corresponding pulleys k and k′ will be moved into engagement with the friction-disks, and vice versa, or the friction-pulleys may be shifted to such position that all the friction-pulleys will be clear of operative engagement with the friction-disks, being in such arrangement in a neutral position, as will be understood by those skilled in the art, and by shifting the pulleys toward and from the center of the friction-disks the speed may be varied. The friction-pulleys are constructed alike and have rawhide or other similar rims 1 and hubs 2, which latter are grooved circumferentially at 3 to receive yokes 4 on the shifter-frame L. This shifter-frame extends around the group of friction-pulleys and is supplied with a yoke 4 for each of said pulleys and is provided at one end with a rack 5, meshed by a pinion M on a suitable shaft, so the shifter-frame may be moved longitudinally to set the pulleys in engagement with the friction-disks and in proper relation thereto, as may be desired, for the purpose of varying the speed, reversing the motion, or stopping the gear.

The shifter-frame L is preferably made in sections telescopically connected at L′, so the front pulleys k and k′ may be moved to a limited extent independent of the rear pulleys K and K′. In the construction shown the side bars of the shifter-frame are made with rods l, headed at l′ and fitting in tubes l², which are slidable in bearings l³ on the main frame, springs l⁴ operating between the bearings l³ and the end of the shifter-frame connected with the pulleys K K′, as best shown in Fig. 1. By this construction the front pulleys may be moved into and out of action without changing the position of the two back pulleys, but at the same time by moving the front pulleys forward out of engagement with the disks D and D′ the heads l′ will drag the tubes l² through the bearings l³ and bring the back pulleys forward into contact with the disks D and D′. The coil-springs l⁴ operate to readjust the back pulleys out of action when desired.

We claim—

1. The combination of a pair of concentric friction-disks having their outer edges turned in toward each other, ball-bearings between the disks at the said edges, counter-shafts geared with their respective disks, pulley-shafts extending parallel with each other and with the disks and made in sections united by universal joints, drive-gearing for said pulley-shafts, eccentrics having bearings for the pulley-shafts, levers between the adjacent pairs of eccentrics and connected therewith, connections between the opposite levers, friction-pulleys keyed on and movable along the pulley-shafts, and a shifter-frame having means engaging with the friction-pulleys, and made in sections having a limited independent movement, and means for operating the shifter-frame, substantially as set forth.

2. In a transmission-gear, the combination of the parallel friction-disks having their arbors fitting telescopically one to the other, driven parts geared with said disks, pulleys operating upon their respective disks, and means for driving and shifting the said pulleys, substantially as set forth.

3. A transmission-gear comprising a pair of independently-movable parallel friction-disks, a pair of pulley-shafts extending approximately parallel with and on opposite sides of said pair of disks, pulleys keyed on and movable longitudinally along the pulley-shafts, the pulleys on the shafts being on opposite sides of the center of the disks, means for operating the shafts, and means for shifting the pulleys along the shafts, substantially as set forth.

4. The combination with a pair of friction-disks, of pulley-shafts extending along the said disks, pulleys on said shafts, means for shifting the pulleys along their shafts, bearings for the opposite pulley-shafts, said bearings being movable toward and from each other, and means for shifting the said bearings toward and from each other, substantially as set forth.

5. In a transmission-gear, the combination of the friction-disks having arbors fitting telescopically one to the other, the driven parts geared with their respective disks, and the friction-pulleys and their shafts, substantially as set forth.

6. In a transmission mechanism, the combination of the pair of concentric parallel and independently-movable friction-disks, and antifriction-bearings between the said disks, substantially as set forth.

7. In a transmission-gear the combination with a pair of parallel, independently-movable disks, of pulley-shafts and pulleys thereon and movable into and out of engagement with the outer faces of their respective disks, substantially as set forth.

8. The combination of a pair of friction-disks, shafts on the opposite sides of the disks, and movable toward and from the disks, and friction-pulleys on the shafts for engagement with the disks and movable longitudinally on the shafts, substantially as set forth.

9. The combination of a pair of friction-disks, shafts on the opposite sides of the disks, gearing between said shafts and friction-pulleys on the shafts and movable along the same into and out of engagement with their respective disks; substantially as set forth.

10. In transmission mechanism, the combination of the friction-disks having telescopic arbors and gears thereon, and counter-shafts having gears meshing with the gears of the arbors, substantially as set forth.

11. In transmission mechanism a pair of concentric parallel disks having their edges inturned and sloping inwardly on their outer faces toward their peripheries, and friction-pulleys movable into and out of engagement with the outer face of said disks, substantially as set forth.

12. In transmission mechanism the combination of a pair of friction-disks, a pair of pulley-shafts extending along the opposite sides of the disks and approximately parallel therewith, friction-pulleys on said shafts on opposite sides of the centers of the disks, and a shifter-frame having means engaging with the friction-pulleys, the said frame being composed of sections telescoping one with the other, means for operating one of the frame-sections, and springs for readjusting the other section, substantially as set forth.

13. The combination with the friction-disks, of friction-pulleys for engagement therewith and a shifter-frame composed of sections having a limited independent movement, said sections being provided with means for engagement with the friction-pulleys, means for operating one of the shifter-frame sections, and springs for readjusting the other shifter-frame section, substantially as set forth.

14. The combination of a pair of parallel concentric independently-movable friction-disks, antifriction-bearings between the said disks at the edges thereof, the counter-shafts geared with their respective disks, pulley-shafts extending along the opposite sides of the disks, pulleys on said shafts for engagement with said disks, eccentrics having bearings for the pulley-shafts adjacent the opposite ends of the latter, means for rocking the eccentrics whereby to move the shafts toward and from the disks, and devices connecting the eccentric-operating means at the opposite ends of the pulley-shafts, substantially as set forth.

WILLIAM DEGEN.
AUGUSTUS MANUEL.

Witnesses:
   D. T. WINNE,
   S. A. STATON.